(12) United States Patent
Hubbard et al.

(10) Patent No.: US 6,187,122 B1
(45) Date of Patent: *Feb. 13, 2001

(54) DUAL-WELD ROOF MEMBRANE WELDING APPARATUS AND METHOD OF USING SAME

(75) Inventors: Michael J. Hubbard, Hollard; John Jordon, Waterville, both of OH (US)

(73) Assignee: Omnova Solutions Inc., Fairlawn, OH (US)

(*) Notice: Under 35 U.S.C. 154(b), the term of this patent shall be extended for 0 days.

This patent is subject to a terminal disclaimer.

(21) Appl. No.: 09/203,702

(22) Filed: Dec. 2, 1998

Related U.S. Application Data

(63) Continuation of application No. 08/803,356, filed on Feb. 20, 1997, now Pat. No. 5,935,357.

(51) Int. Cl.[7] .................................................. B32B 31/00
(52) U.S. Cl. .......................... 156/82; 156/497; 156/499; 156/544; 156/574
(58) Field of Search ........................... 156/82, 497, 499, 156/544, 545, 574

(56) References Cited

U.S. PATENT DOCUMENTS

| | | | |
|---|---|---|---|
| 4,744,855 | * 5/1988 | Ellenberger | 156/499 |
| 4,834,828 | * 5/1989 | Murphy | 156/574 |
| 4,872,941 | * 10/1989 | Lippman | 156/497 |
| 5,353,782 | * 10/1994 | Morris | 156/82 |
| 5,935,357 | * 8/1999 | Hubbard | 156/499 |

* cited by examiner

Primary Examiner—Michael W. Ball
Assistant Examiner—Gladys Piazza
(74) Attorney, Agent, or Firm—Robert F. Rywalski; Larry R. Meenan

(57) ABSTRACT

A dual-weld heat welding apparatus capable of simultaneously welding a first membrane and an overlapping second membrane on opposite sides of a roof membrane fastening apparatus fastened through the first membrane and located under the overlapping second membrane. The heat welding apparatus includes a movably supported chassis, a hot air welder attached to the chassis including a nozzle having an outlet including at least one opening for simultaneously applying a weld on opposite sides of the roof membrane fastener to weld the overlapping second membrane and the first membrane, and at least one weld wheel rotatably attached to the chassis and located rearward of the nozzle relative to the direction of movement of the apparatus and capable of simultaneously applying pressure to the weld on each side of the roof membrane fastener.

17 Claims, 9 Drawing Sheets

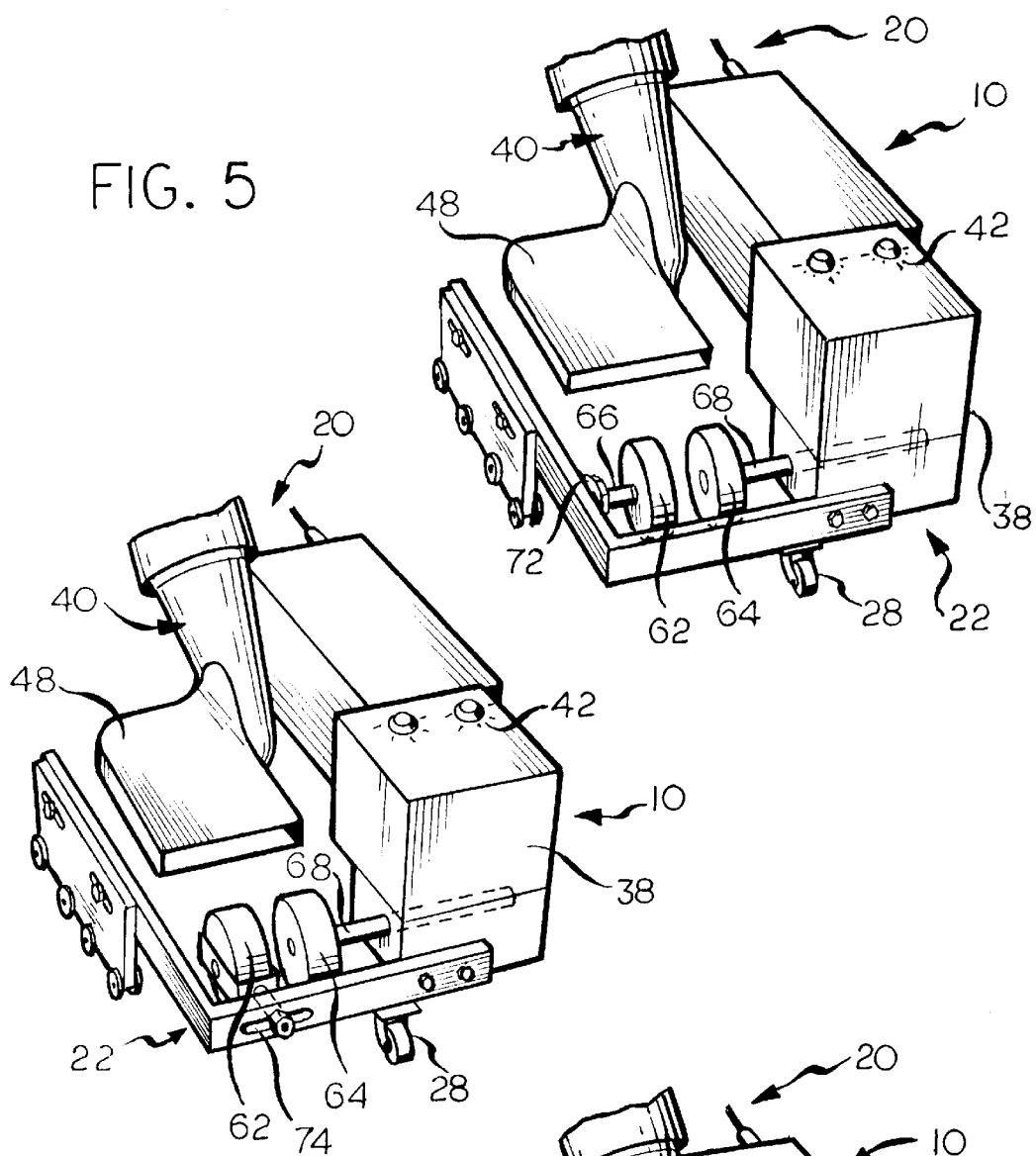
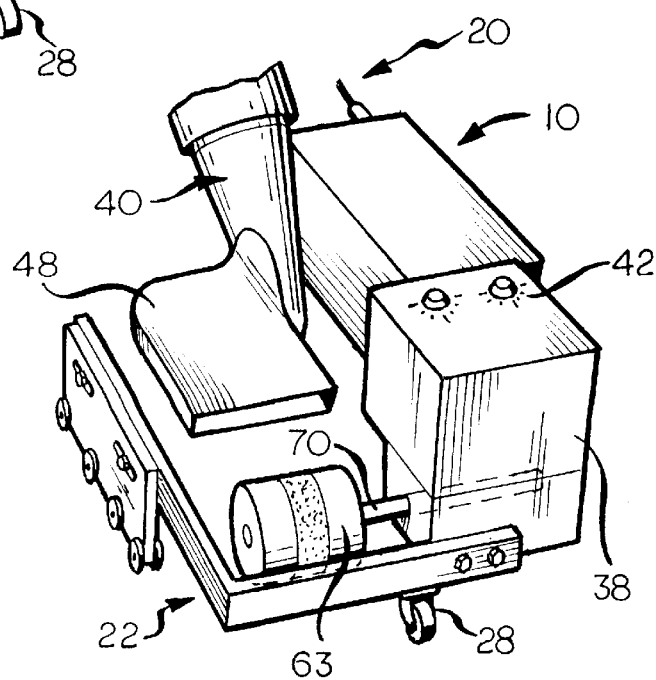
FIG. 5
FIG. 6
FIG. 7

DUAL-WELD ROOF MEMBRANE WELDING APPARATUS AND METHOD OF USING SAME

CROSS REFERENCE TO RELATED APPLICATION

The application is a continuation of patent application Ser. No. 08/803,356, filed Feb. 20, 1997 entitled, "Dual-Weld Roof Membrane Welding Apparatus And Method Of Using Same", now U.S. Pat. No. 5,935,357 incorporated herein by reference.

FIELD OF THE INVENTION

This invention relates to a dual-weld roof membrane welding apparatus and a method of using the same. More particularly, this invention relates to a roof membrane welding apparatus for simultaneously applying welds on each side of a roof membrane fastener to join two overlapping membranes of a membrane roofing system and a method of using the same.

BACKGROUND OF THE INVENTION

A membrane roofing system generally includes a roof deck which is considered the structural supporting surface of a building extending between the surrounding exterior walls of the building. The roof deck may be constructed from plywood, metal decking or concrete or any other suitable material. Depending upon the construction, the roof deck may extend over the surrounding exterior walls or the roof deck may stop short of the exterior walls thereby forming a parapet wall, i.e., a low retaining wall at the edge of the roof deck. If desired, the membrane roofing system may also include an insulation barrier formed from polyisocyanarate or any other suitable material applied over the roof deck.

To make the roof deck and building weather resistant a single-ply membrane roof may be installed over the roof deck. The single-ply membrane roof refers to a water impermeable single sheet of polymeric material such as thermoplastic olefins, chlorinated polyethylene, polyvinyl chloride, chlorosulfanated polyethylene or ethylene propylene diene rubber (EPDM) having a preapplied hot melt adhesive. The membrane roof has heretofore been installed on the roof deck using a variety of different methods.

For example, the field or interior of the membrane roof may be held to the roof deck by the use of ballast and/or penetrating or non-penetrating fastener of a type well known in the art. An example of a penetrating fastener for retaining the field of a membrane roof installed to a roof deck is a plurality of small, circular, metal plates having a hole in the center and a roofing screw. In order to anchor the membrane roof, the small, circular, metal plates are spaced apart in rows on the membrane roof and the fastener is driven through the hole in each plate, the membrane roof, any insulation material and then into the roof deck. The metal plates are then covered by overlapping roof membrane. An example of a non-penetrating fastener is an adhesive that totally adheres the field of the membrane roof to the roof deck.

An important consideration for a membrane roof system is that the system withstand wind uplift forces. A high wind uplift rating may be required anywhere wind uplift characteristics are quite severe, e.g., very tall buildings. Consequently, in order to withstand wind uplift forces the membrane is typically fastened to the deck at close intervals over the entire membrane surface thereby minimizing the areas of membrane not secured to the roof deck. If the membrane sheets are secured only along the longitudinal edges, the width of the membrane sheets should be restricted to at least a dimension of only about 5–6 feet in order to ensure adequate resistance to wind uplift in the membrane between fastening locations.

In one process for laying single ply membranes on a roof deck, a first membrane is laid on a portion of the roof deck. After the membrane is laid, a roof membrane fastener such as a batten bar or a line of stress plates or the like is placed near the edge of the membrane. The batten bar or line of stress plates is positioned parallel to the edge and staggered parallel to the edge for the entire length of the edge. Each batten bar or stress plate is secured to the roof membrane by inserting mechanical fasteners through the batten bar or stress plate, and the membrane, and into or through the roof deck. Then another membrane is laid on the roof deck. A small portion of the second membrane overlaps the area where the batten bars or stress plates were laid on the first membrane. The overlapping edge area of the second membrane overlaps an area of the first membrane on both sides of the batten bars or line of stress plates. A weld is then applied between the lower first membrane and the upper second membrane on one side of the batten bars or line of stress plates and then another weld is applied between the two membranes on the other side of the batten bars or line of stress plates. This results in the fusion of the two membranes on both sides of the batten bars or line of stress plates, thus providing a secure dual-weld of the membranes. It will be appreciated that the significance of having a weld on each side of the fastener, i.e., dual-weld, is that under high wind loads, the membrane roofing system, especially the membrane and weld seam at the point of mechanical attachment are placed in a shear mode of failure. Normally, the strength values until failure of a weld seam in a shear mode are at least four times the strength values experienced in a peel mode. Accordingly, high wind uplift loads may be achieved and/or the number of fasteners utilized may be reduced and achieve the same wind uplift load otherwise achieved with a single weld seam.

A roof membrane welding apparatus for forming a weld on each side of a fastener is described in U.S. Pat. No. 4,834,828, incorporated herein by reference. The roof membrane welding apparatus includes a nozzle having two outlets of a fixed width for applying welds to the membranes on both sides of the roof membrane fastener and a single bifurcated weld wheel of a fixed width located in front of the nozzle to press the two membranes together after the welds have been applied. Although the welding apparatus described in U.S. Pat. No. 4,834,828 has been proven to perform satisfactorily, further improvements in the apparatus for attaching a membrane roof to a roof deck are desired. For example, it will be appreciated that different types of roof decks or roof conditions may require the use of different types of mechanical fasteners and/or roof membrane fasteners. Gypsum and tectum decks require auger type mechanical fasteners that are much larger in thread diameter than mechanical fasteners utilized in other deck materials. Accordingly, because the mechanical fasteners are larger, the roof membrane fastener used must also be wider. However, the known welding apparatus is not designed to accomodate different widths of roof membrane fasteners and apply a weld of substantially the same width along the side of the roof membrane fastener. Furthermore, the known welding apparatus is not designed to accomodate different widths of roof membrane fasteners and uniformly press the two overlapping roof membranes together adjacent the side of each roof membrane fastener regardless of the width of the roof membrane fastener used.

In view of the foregoing, an object of the present invention is to provide a dual-weld roof membrane welding apparatus for welding single-ply roof membranes and simultaneously forming a weld seam on each side of a roof membrane fastener. Another object of the present invention is to provide a dual-weld roof membrane welding apparatus that is adjustable to accomodate a variety of different size roof membrane fasteners to apply a heat weld simultaneously on each side of the fasteners. Another object of the present invention is to provide a dual-weld roof membrane welding apparatus that spans across the width of each roof membrane fastener and allows the apparatus to track alongside of the roof membrane fastener as the apparatus moves across the membrane thereby applying a weld uniformly spaced from the edge of the roof membrane fastener. Yet another object of the present invention is to provide a dual-weld roof membrane welding apparatus that includes the capability of applying welds to overlapping single ply roof membranes on both sides of a roof membrane fastener regardless of the width of the roof membrane fastener used. Another object of the present invention is to provide a dual-weld roof membrane welding apparatus that is capable of accomodating different widths of roof membrane fasteners and uniformly pressing the two overlapping roof membranes together adjacent the side of each roof membrane fastener regardless of the width of the roof membrane fastener used. Yet another object of the present invention is to provide a dual-weld roof membrane welding apparatus that is simple to use and economical to manufacture.

It will be appreciated that by using a welding apparatus that is capable of applying welds to overlapping single ply roof membranes on both sides of a roof membrane fastener, regardless of the width of roof membrane fastener used, the welding of the overlapping roof membranes can be done more efficiently. It will be further appreciated that by using a welding apparatus that is capable of accomodating different widths of roof membrane fasteners the apparatus is more effective in pressing the overlapping membranes together after welding thus providing for better welds which are more likely to hold the membranes together.

SUMMARY OF THE INVENTION

Briefly, the present invention relates to a dual-weld roof membrane welding apparatus capable of simultaneously welding a first membrane and an overlapping second membrane on opposite sides of a roof membrane fastening apparatus fastened through the first membrane and located under the overlapping second membrane. The heat welding apparatus includes a movably supported chassis, a hot air welder attached to the chassis including a nozzle having an outlet including at least one opening for simultaneously applying a weld on opposite sides of the roof membrane fastener to weld the overlapping second membrane and the first membrane, and at least one weld wheel rotatably attached to the chassis and located rearward of the nozzle relative to the direction of movement of the apparatus and capable of simultaneously applying pressure to the weld on each side of the roof membrane fastener.

At least one of the weld wheels may be laterally adjustable to vary the distance between the weld wheels to accomodate roof membrane fasteners of different widths. In another embodiment, the apparatus may include at least one opening of the outlet of an adjustable width for simultaneously applying a weld on opposite sides of the roof membrane fastener to weld the overlapping second membrane and the first membrane. In yet another embodiment, the apparatus may include at least one guide rail attached to an underside of the nozzle to maintain a bottom surface of the nozzle a selected distance away from a top surface of the first membrane.

BRIEF DESCRIPTION OF THE DRAWINGS

Further features and other objects and advantages of this invention will become clear from the following detailed description made with reference to the drawings in which:

FIGS. 2–7 are partial perspective views of a dual-weld roof membrane welding apparatus having alternate weld wheel arrangement;

DETAILED DESCRIPTION OF THE PREFERRED EMBODIMENTS

Figure 1:
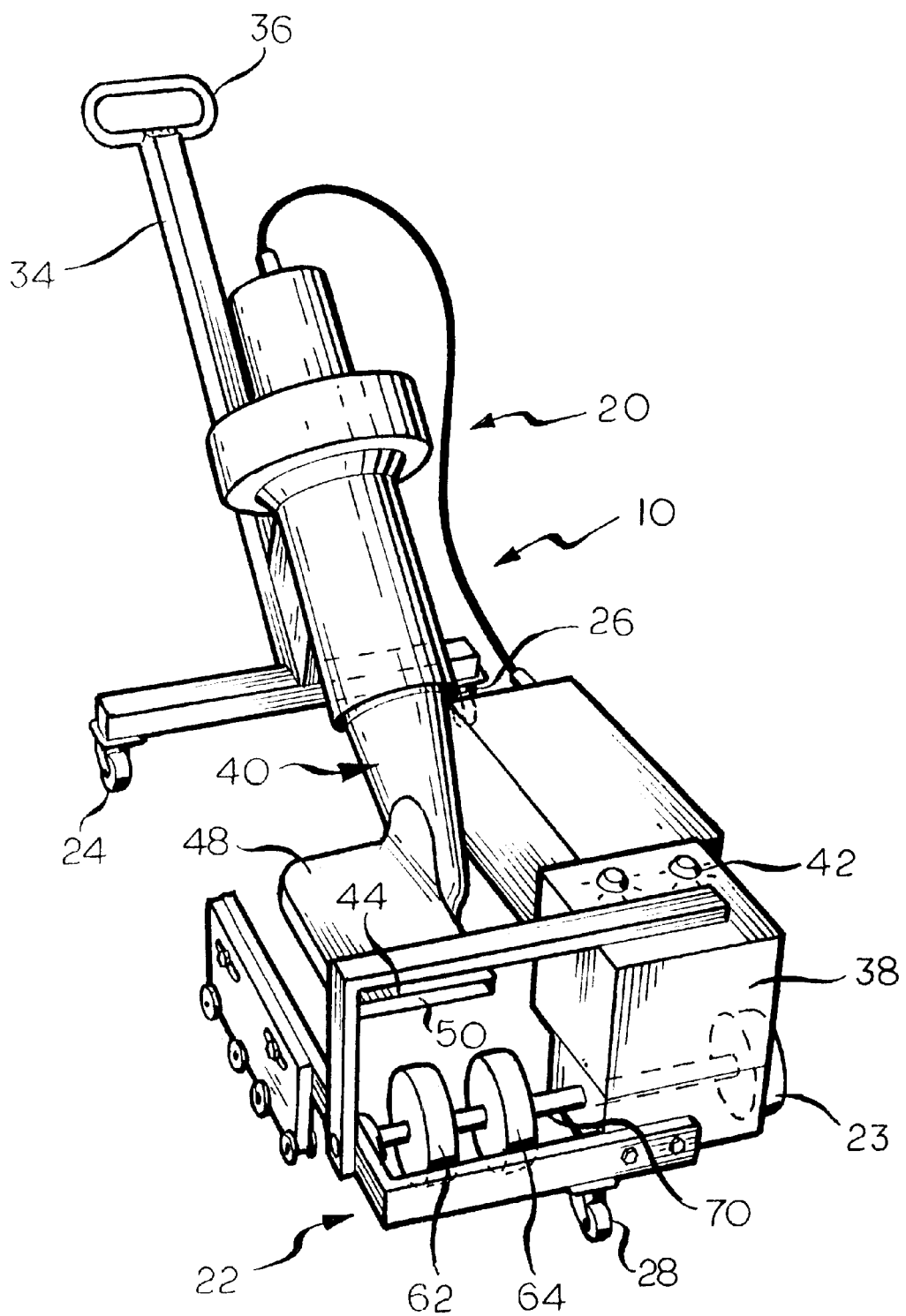
FIG. 1 is a perspective view of a dual-weld roof membrane welding apparatus.
Figure 2:
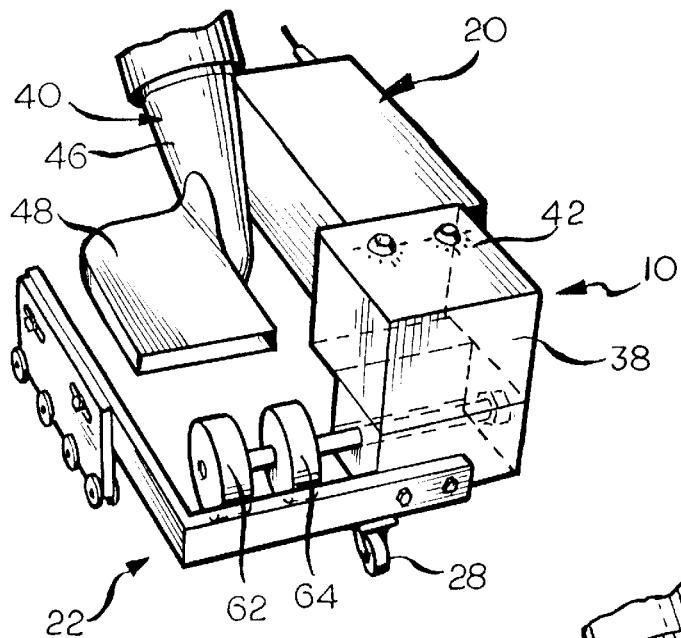

In the following description, like reference characters designate like or corresponding parts. Also in the following description, it is to be understood that such terms as "forward", "rearward", and the like, are words of convenience and are not to be construed as limiting terms apart from the invention as claimed.

The present invention is directed to a dual-weld roof membrane welding apparatus 10 capable of simultaneously welding overlapping first and second membranes 12 and 14 to form a single-ply membrane roof installed over a roof deck 16 or other roofing structure. The first membrane 12 and the second membrane 14 refer to water impermeable single-ply sheets of polymeric material such as thermoplastic olefins, chlorinated polyethylene, polyvinyl chloride, or chlorosulfanated polyethylene or ethylene propylene diene rubber (EPDM) having a preapplied hot melt adhesive such as a commercially available polyester or butyl hot melt and the like. The sheets may be of any suitable length and width as desired subject to manufacturing and performance considerations.

The first membrane 12 is placed on the roof deck 16 and has at least one roof membrane fastener 18 secured through the first membrane and to the roof deck. The roof membrane fastener 18 may be of most any suitable size and type depending upon membrane roof system performance requirements. For example, the roof membrane fastener 18 may be of a type well known in the art such as a batten bar or seam disc size and the like and may vary from about 1 inch to about 4 inches or more in width. The roof membrane fasteners 18 are secured adjacent and parallel to an edge of the first membrane 12 along the length of the edge in a staggered relationship. The roof membrane fasteners 18 do not touch the edge of the first membrane 12. The second membrane 14 overlaps a portion of the first membrane 12 on both sides of the roof membrane fasteners 18. The overlapping portions of the first and second membranes 12 and 14 are then held together by heat sealing welds formed simultaneously on opposite sides of the roof membrane fasteners 18 by the dual-weld roof membrane welding apparatus 10.

Figure 8:
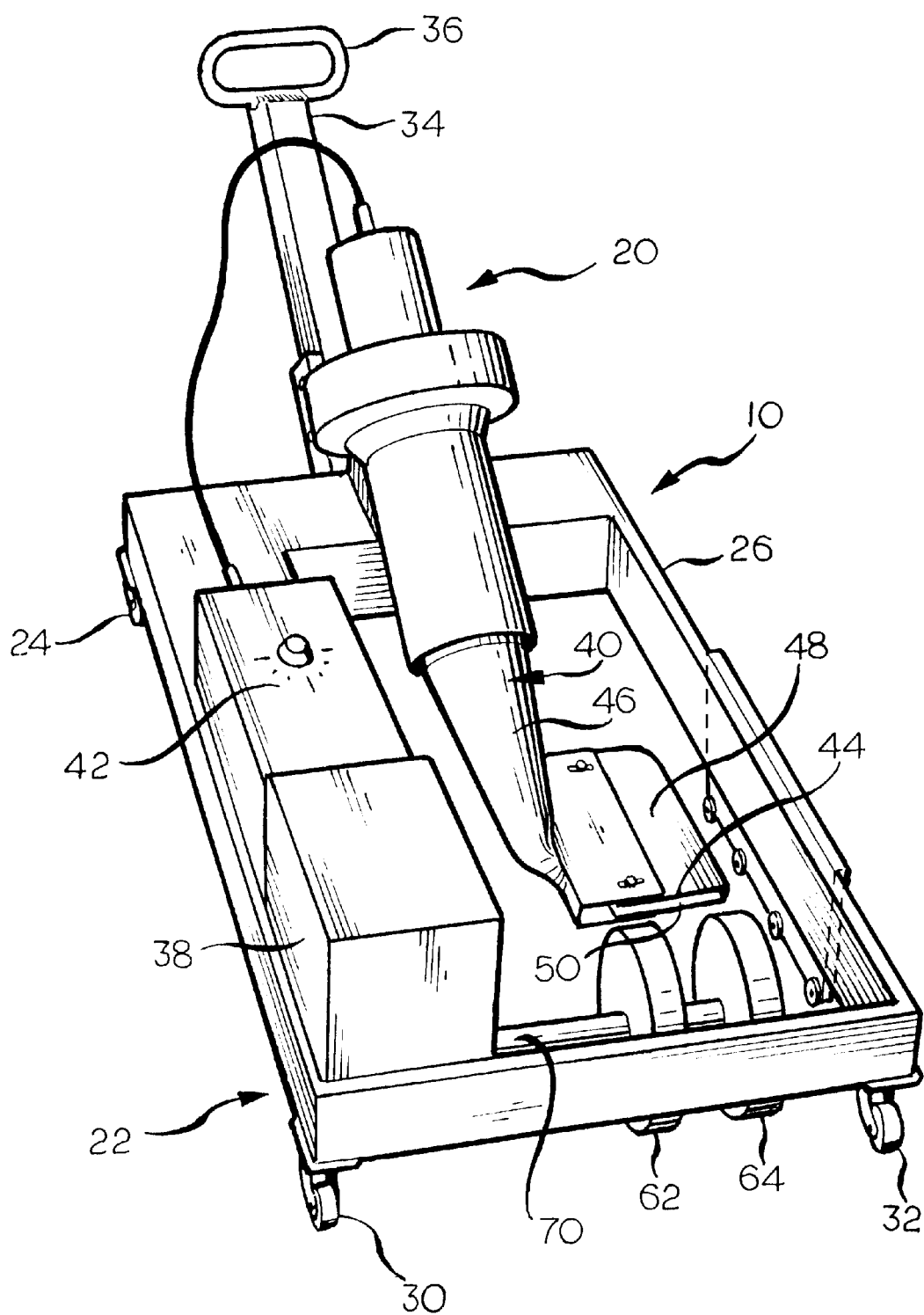
FIG. 8 is a perspective view of an alternate dual-weld roof membrane welding apparatus.
Figure 9:
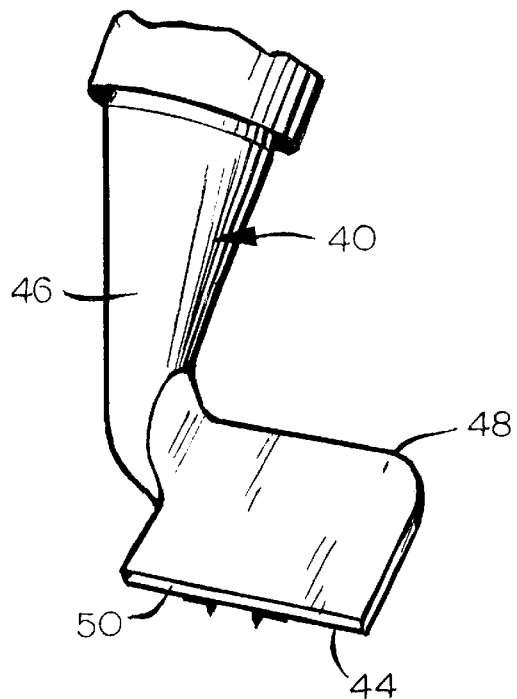
FIG. 9 is a partial perspective view of a nozzle for a roof membrane welding apparatus of a type shown in FIGS. 1 and 8.
Figure 11:
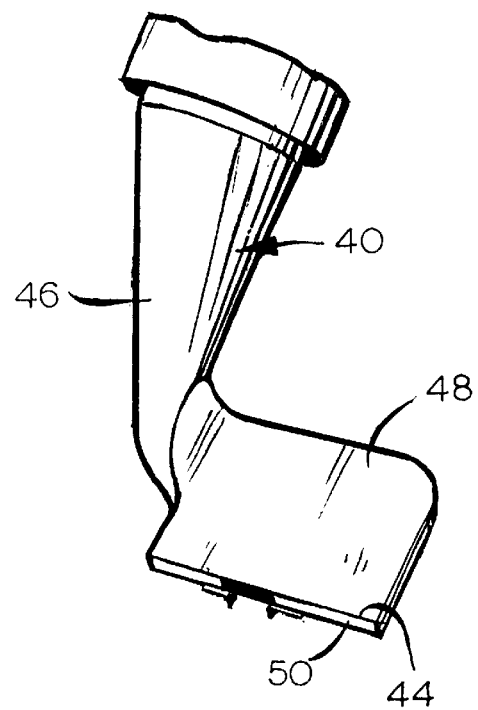
FIG. 11 is a partial perspective view of a nozzle for a roof membrane welding apparatus of a type shown in FIGS. 1 and 8.
Figure 10:
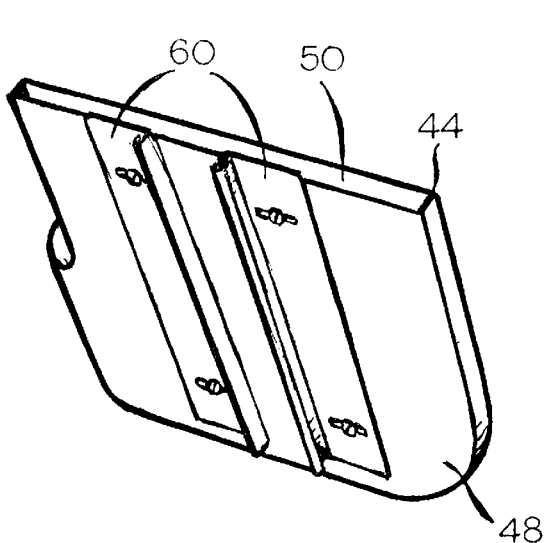
FIG. 10 is an enlarged perspective view of a distributor housing of the nozzle of FIG. 9.
Figure 12:
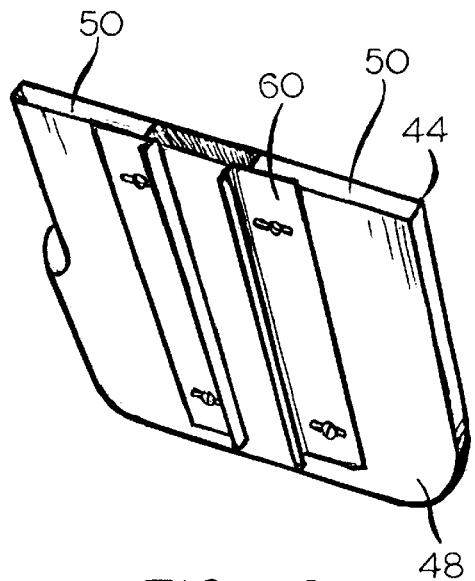
FIG. 12 is an enlarged perspective view of a distributor housing of the nozzle of FIG. 11.
Figure 13:
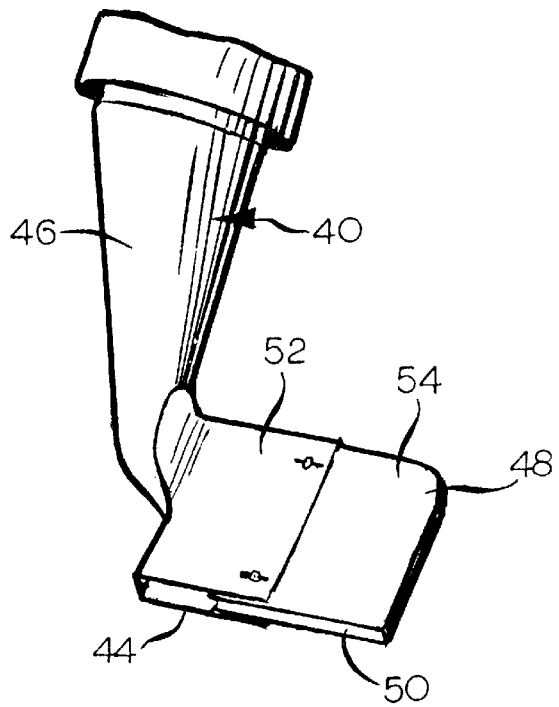
FIG. 13 is a partial perspective view of a nozzle for a roof membrane welding apparatus of a type shown in FIGS. 1 and 8.
Figure 15:
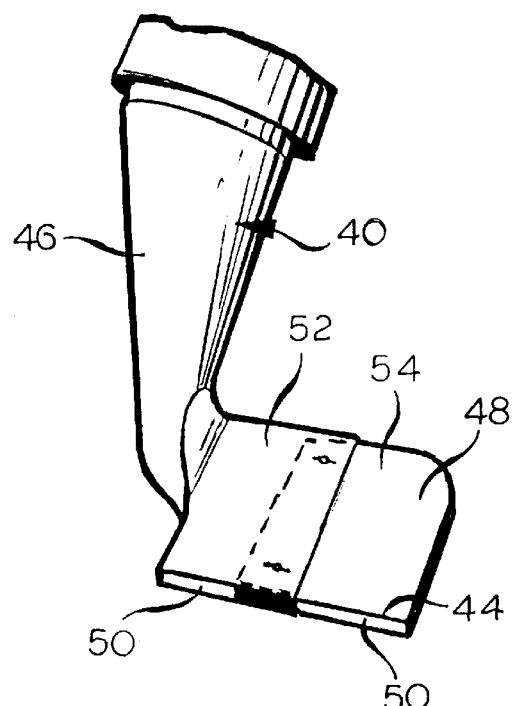
FIG. 15 is a partial perspective view of a nozzle for a roof membrane welding apparatus of a type shown in FIGS. 1 and 8.
Figure 14:
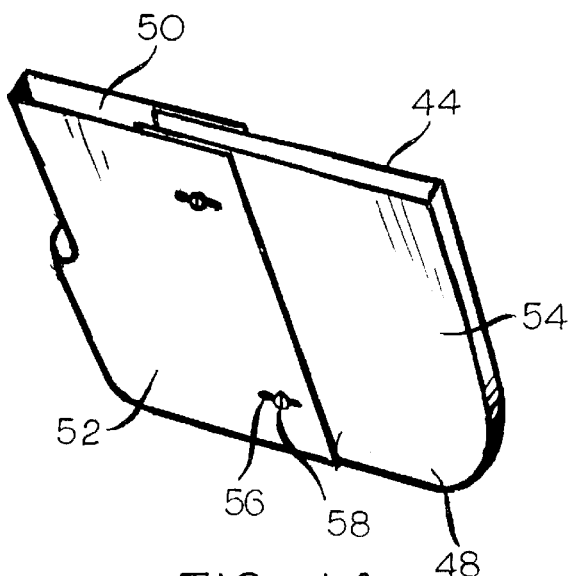
FIG. 14 is an enlarged perspective view of a distributor housing of the nozzle of FIG. 13.
Figure 16:
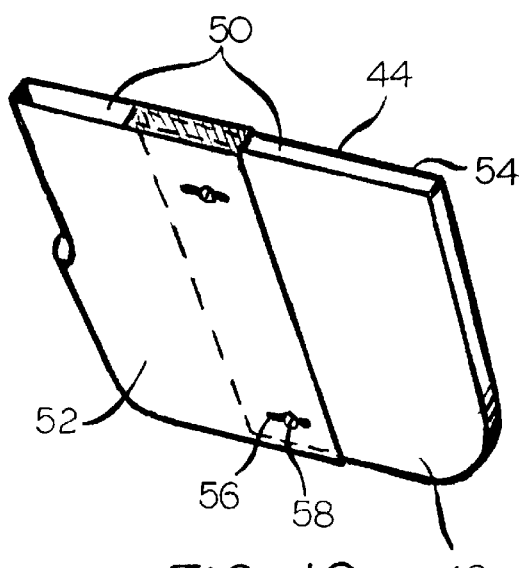
FIG. 16 is an enlarged perspective view of a distributor housing of the nozzle of FIG. 15.
Figure 17:
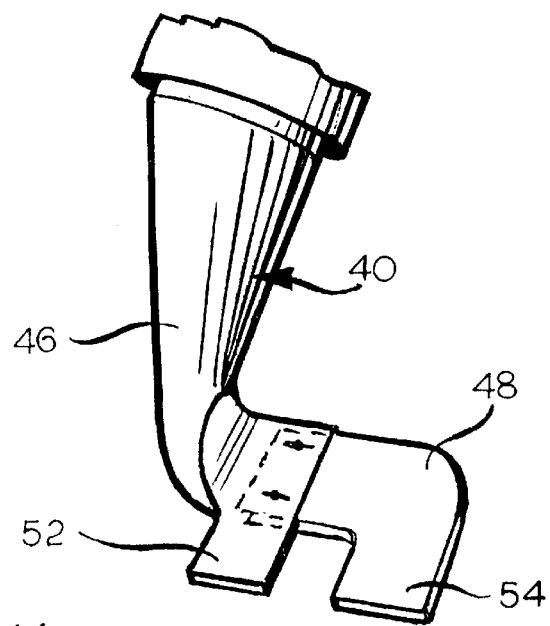
FIG. 17 is a partial perspective view of a nozzle for a roof membrane welding apparatus of a type shown in FIGS. 1 and 8.
Figure 18:
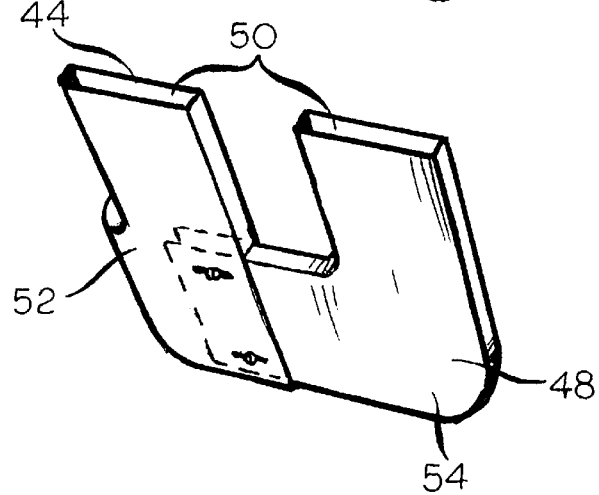
FIG. 18 is an enlarged perspective view of a distributor housing of the nozzle of FIG. 17.
Figure 20:
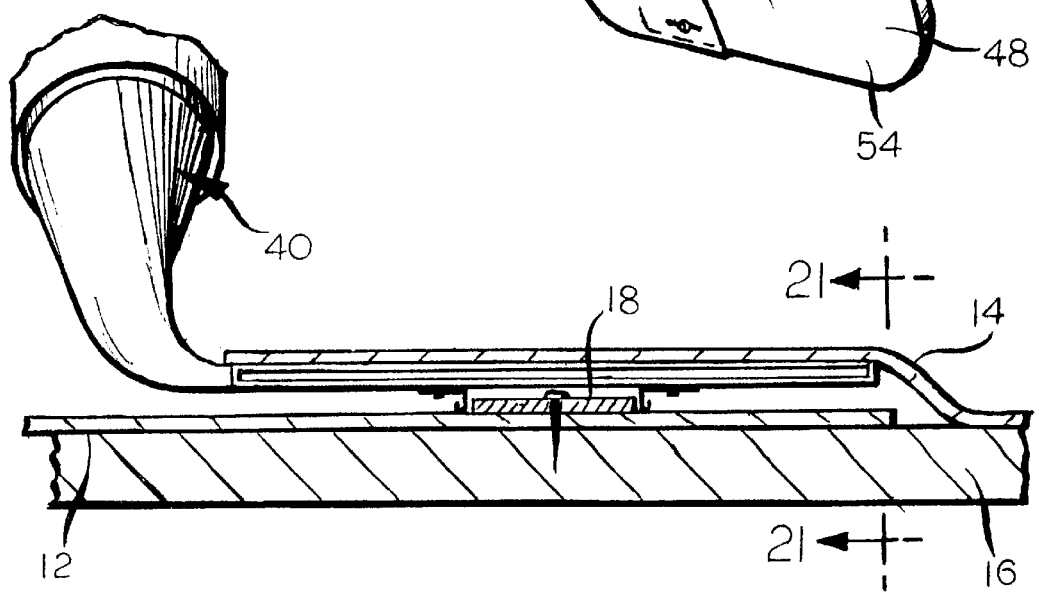
FIG. 20 is an enlarged partial rear view of the nozzle, fastener and overlapping roof membranes of FIG. 19.
Figure 19:
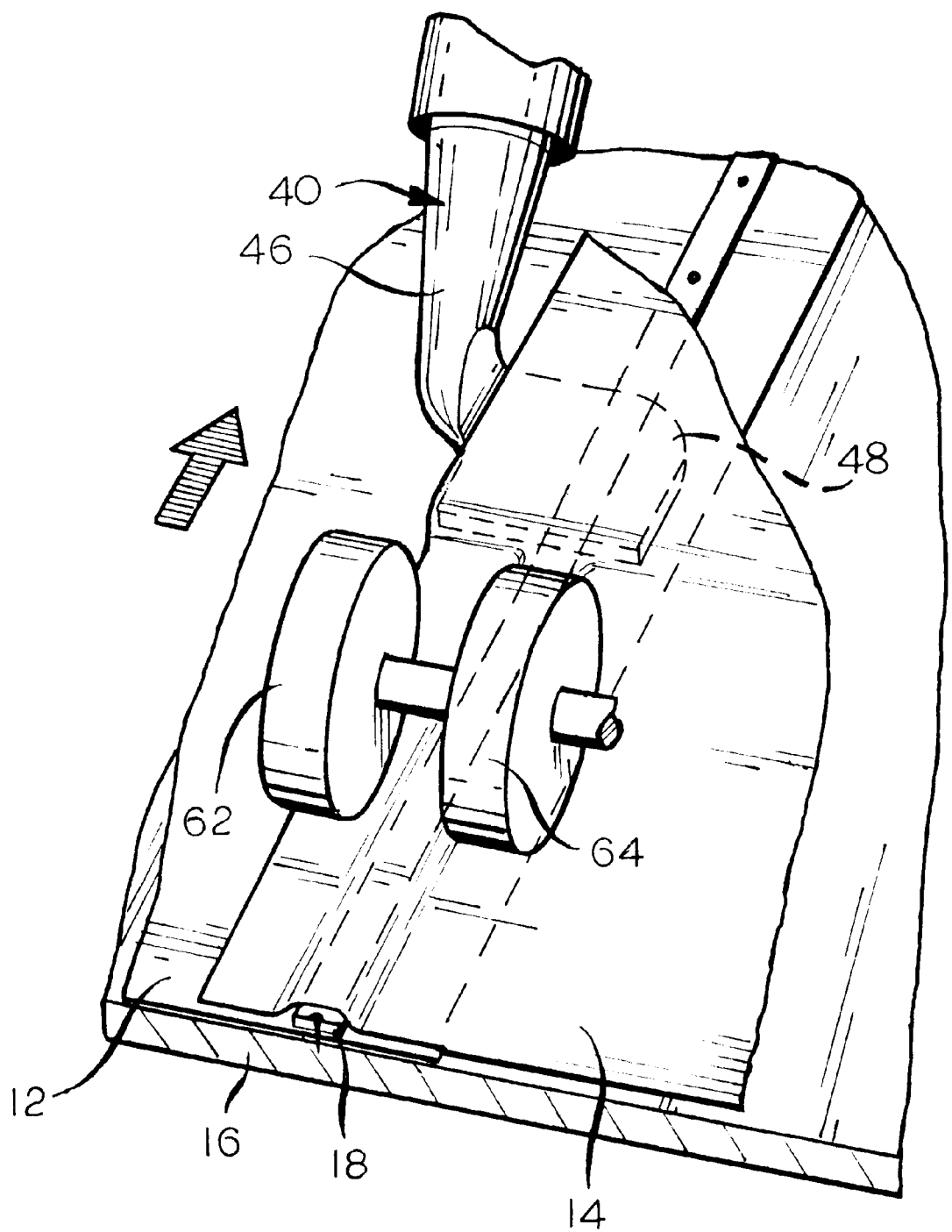
FIG. 19 is an enlarged partial perspective view of the nozzle and adjustable weld wheels welding a fastener between overlapping roof membranes.
Figure 21:
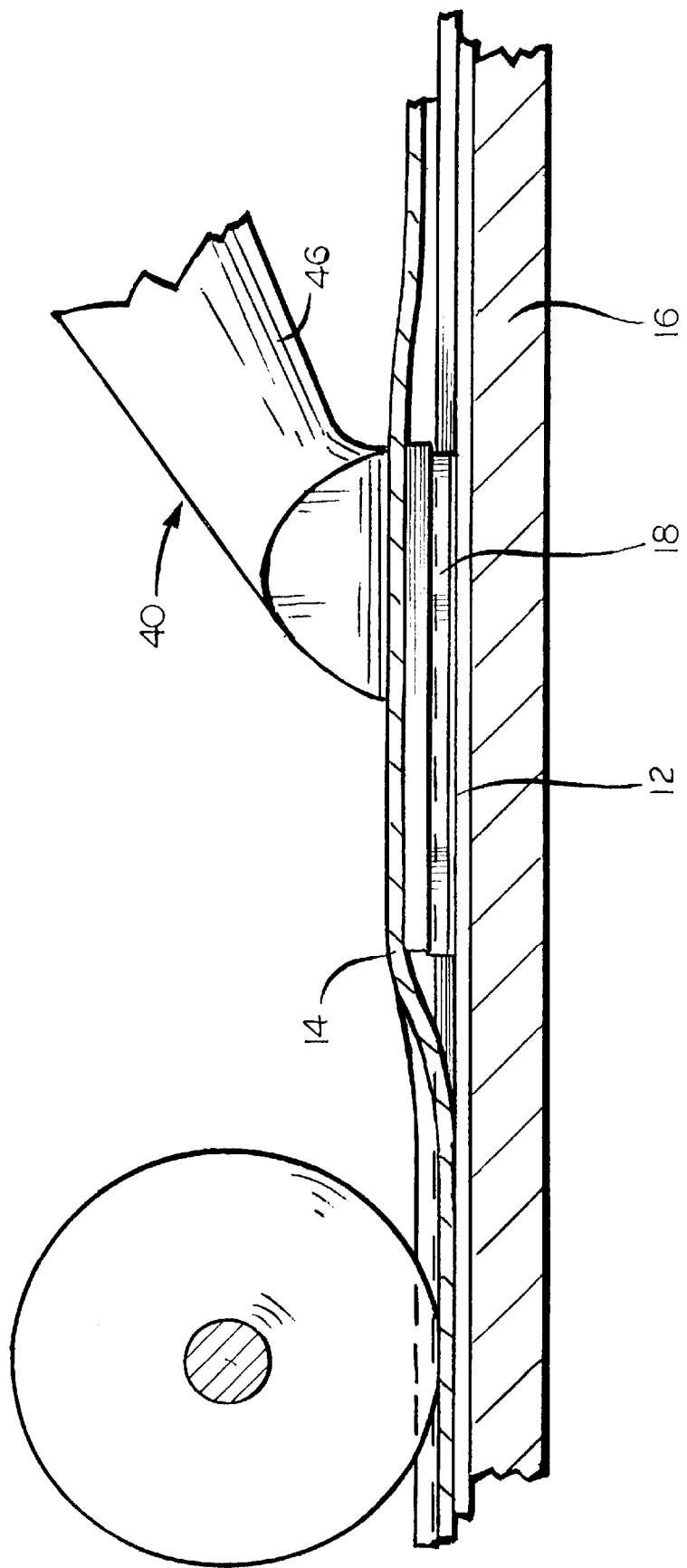
FIG. 21 is an enlarged partial side view of the of the nozzle, adjustable weld wheel and overlapping roof membranes of FIG. 20 taken along line 21–21.

As shown in FIGS. 1 and 8, the dual weld roof membrane welding apparatus 10 includes a hot air welder 20 and a chassis 22 movably supported by wheels. In one embodiment, the chassis 22 is movably supported by a set of two spaced rear wheels 24 and 26 and a third forward wheel 28. The spaced rear wheels 24 and 26 and forward wheel 28 are mounted to the underside of the chassis 22 using most any suitable means well known in the art. The third forward wheel 28 is preferably mounted proximate the middle of the chassis. In yet another embodiment, the chassis 22 is movably supported by a set of two spaced rear wheels 24 and 26 and a set of two spaced forward wheels 30 and 32. The rear wheels 24 and 26 and forward wheels 30 and 32 are mounted to the underside of the chassis 22 adjacent each corner of the chassis. The forward wheels 28 and 30 and 32 are operably attached to a riser assembly mechanism comprising a lever which is screwably inserted into a bracket and a plate. The riser assembly mechanism facilitates height adjustment of the forward wheels from a retracted position to an extended position to allow the weld wheels to rest upon the membrane when in operation. For a more detailed description of the riser assembly mechanism reference is made to U.S. Pat. No. 4,834,828, incorporated herein by reference. It will be appreciated from the foregoing that most any suitable number of wheels and arrangement of wheels may be used to movably support the chassis.

The chassis 22 is preferably a one piece frame of cast aluminum. Extending generally upward from the chassis 22 is a guide handle 34 at the end of which is a grip 36. In a preferred embodiment, the guide handle 34 is an aluminum rod and is mounted to a threaded boss on the chassis 22. The chassis 22 is motor driven by a heavy duty electrical motor 38 of a type well known in the art. The motor 38 drives at least one drive wheel for movably transporting the chassis 22. The at least one drive wheel may be the same as one or more of the wheels 24–32 or may be a separate wheel 23. The motor 38 is operatively coupled to at least one of the wheels 24–32 or 23 through a gear transmission which is selectively engaged or disengaged with a drive axle by a transmission lever. The motor 38, thus, operates to drive at least one of the wheels 24–32 or 23 and to move the dual-weld roof membrane welding apparatus 10 in the forward direction. As the roof membrane welding apparatus 10 moves forward, it is guided by manipulation of the guide handle 34.

Attached to the chassis 22 is the hot air welder 20. The hot air welder 20 includes a heating element for heating air and a blower for blowing the heated air to a nozzle 40 for selective distribution. A preferred heating element comprises a coil enclosed within a ceramic material, and has a wattage of about 3,000 watts. The hot air welder 20 is attached to the chassis 22 by means of a welder cradle of a type well known in the art which is bolted to the chassis.

A control panel 42 is mounted to the chassis 22 for adjusting the speed and temperature of the hot air welder 20. For example, the amount of heat emitted by the heating element may be controlled by a thermostat, rheostat, or a potentiometer and the like operatively connected to a control knob of the control panel 42.

For a more detailed discussion of a chassis, motor, control panel and hot air welder arrangement and operation, reference is made to U.S. Pat. Nos. 4,855,004 and 4,834,828, incorporated herein by reference.

The nozzle 40 is operatively attached to the blower. The nozzle 40 selectively transfers heat produced by the heating element and blown by the blower to the first and second membranes 12 and 14 thereby forming a dual-weld as further described herein. The nozzle 40 includes an outlet 44 having at least one opening 50 for simultaneously applying a heat sealing weld on opposite sides of the roof membrane fastener 18 to weld the overlapping second membrane 14 and the first membrane 12. The roof membrane welding apparatus 10 includes an outlet 44 wide enough to achieve at least a ½ inch wide weld on each side of the roof membrane fastener 18.

As shown in the figures, the nozzle 40 includes an upper housing 46 tapered at an angle to a distributor housing 48 for directing the flow of air. The upper housing 46 and distributor housing 48 may be of most any suitable material. The distibutor housing 48 slides between the overlapping membranes 12 and 14 and over the roof membrane fastener 18.

Referring to FIGS. 1–9, 10, 13 and 14, the flow of heated air from the outlet 44 may be from a single opening 50 and span across the entire width of the roof membrane fastener 18 to form a heat sealing weld on each side of the fastener, or, referring to FIGS. 11, 12 and 15–18, the flow of heated air from outlet 44 may be bifurcated to form two openings 50 to selectively apply the heated air only on each side of the roof membrane fastener 18. The flow of heated air may be bifurcated by blocking a portion of the outlet 44 thereby diverting the flow of air to the openings 50 within the outlet. In a preferred embodiment, the effective size of the opening (s) 50 of the outlet 44 may be adjusted as desired to vary the flow of air to apply a heat sealing weld to the overlapping first and second membranes 12 and 14 on each side of the roof membrane fastener 18. It will be appreciated that by merely varying the effective size of the opening(s) 50 of the outlet 44 a suitable weld at least ½ inch wide may be formed on each side of the roof membrane fastener 18 regardless of the width of the roof membrane fastener used.

In accordance with one embodiment, as shown in FIGS. 13–18, the effective width of the opening 50 may be varied by forming the distributor housing 48 of two matching sections 52 and 54. At least one section 52 or 54 includes at least one slot 56 and the other section includes a fastener 58 operativerly connected through the at least one slot to control a sliding movement of the matching sections to vary the width of the at least one opening 50. The slot 56 is formed substantially parallel to the direction of movement of the matching section. The sliding movement of the matching sections 52 and 54 may be prevented by tightening the fastener 58 to secure the distance between the sections as desired thereby fixing the width of the opening(s) 50. The fastener 58 may be a threaded sheet metal screw, nut and bolt or the like, as well known in the art.

In yet another embodiment of the invention, the nozzle 40 may include at least one guide rail 60 attached to the underside of the nozzle. The at least one guide rail 60 maintains the bottom of the nozzle 40 away from the top surface of the first membrane 12 a selected distance to allow the nozzle to clear the top of the roof membrane fastener 18 thereby providing a heated air stream of consistent velocity and temperature to the membranes. It will be appreciated that during operation of the welding apparatus 10, the leading bottom edge of the nozzle 40 has a tendency to catch on the leading edge of the roof membrane fastener 18 that projects above the surface of the first membrane 12 as the nozzle slides across the top surface of the first membrane thereby affecting the smooth and efficient operation of previous roof membrane welding apparatus. Furthermore, an added feature of the at least one guide rail 60 is that the guide rail assists in tracking the nozzle 40 along the row of roof membrane fasteners 18 thereby ensuring proper placement of the heated air stream.

In a preferred embodiment, two parallel spaced guide rails 60 are used and at least one of the guide rails is laterally adjustable to accommodate therebetween roof membrane fasteners 18 of different widths and types as previously described. The parallel spaced guide rails 60 allow the dual-weld roof membrane welding apparatus to mechanically follow a path defined by the row of roof membrane fasteners 18 ensuring proper placement of the heated air stream without requiring visual inspection by the operator of the placement of the nozzle 40 with respect to the roof membrane fasteners located under the second membrane 14.

The roof membrane welding apparatus 10 may also include at least two weld wheels 62 and 64 or a weld wheel 63 made of a duo-durometer material having a soft middle material and a hard outer material. The duo-durometer material may be a urethane, silicone or a foam material and the like, having a Shore A hardness of about 50 or more for hard outer material and of about 40 or less for the soft middle material. It will be appreciated that the weld wheels 62 and 64 or weld wheel 63 must allow the roof membrane fasteners to pass between the weld wheels or underneath the weld wheel and allow the weld wheels to simultaneously press the first membrane 12 and the second membrane 14 against the roof deck 16 on both sides of the roof membrane fasteners.

The weld wheels are located rearward of the nozzle 40 relative to the direction of movement of the dual-weld roof membrane welding apparatus. The weld wheels 62 and 64 are located in front of the outlet 44 of the nozzle 40 to press the first membrane 12 and the second membrane 14 firmly against the roof deck 16 and against each other after the welds have been simultaneously applied. As a further aid in keeping as much pressure on the roof membranes 12 and 14 as possible, one or more weights may be affixed to the chassis over the weld wheels 62 and 64.

The weld wheels 62 and 64 may be rotatable on separate axles 66 and 68 attached to the chassis 22 (FIGS. 3–6) or the weld wheels may be rotatable on a single axle 70 attached to the chassis 22 (FIGS. 1, 2, 7 and 8).

Figure 3:
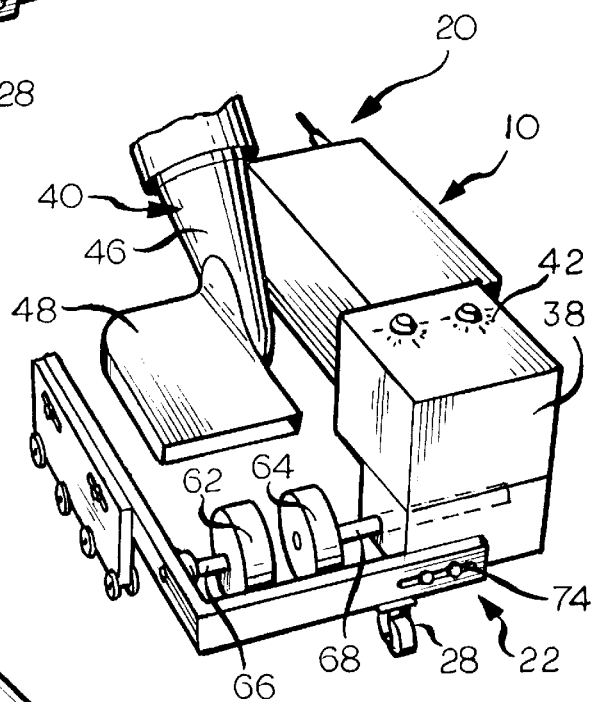
Figure 4:
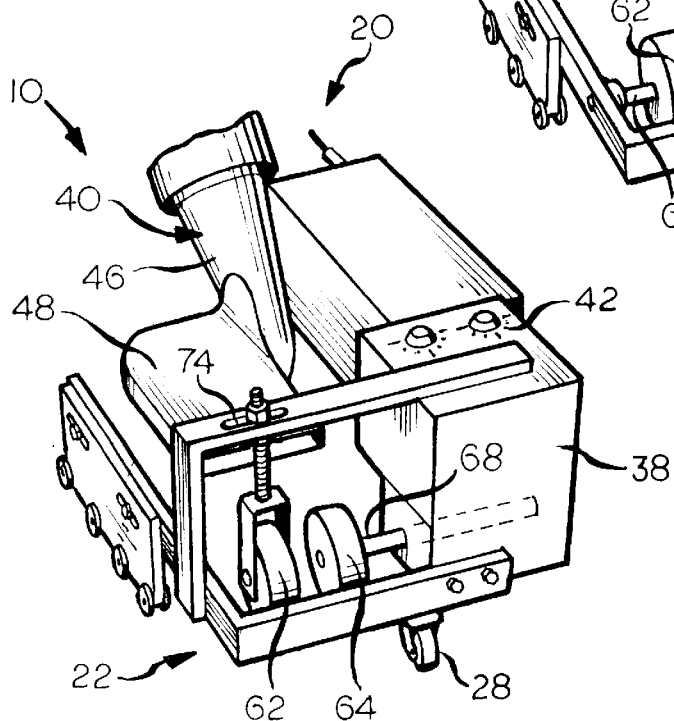

The length of the axles 66–70 and the position of the weld wheels 62 and 64 may be adjusted by varying the length of the axle 66–70 by the position of an attachment nut 72 of the axle to the chassis. In yet another embodiment, the position of the weld wheel 64 may be varied by varying the position the weld wheel along the longitudinal length of a slot 74. As shown in FIG. 4, the weld wheel 64 is attached to a bracket 73 adjustable along the longitudinal length of the slot 74 or, as shown in FIG. 3, the weld wheel 64 is attached to an axle 66 attached to a bracket of the chassis adjustable along the longitudinal length of the slot 74.

It will be appreciated that by providing for lateral adjustment of the weld wheels 62 and 64 with repect to each other, one welding apparatus 10 may be used to weld overlapping first and second membranes 12 and 14 employing a wide variety of roof membrane fasteners 18 of different sizes and types as previously decsribed. Moreover, by making the weld wheels 62 and 64 laterally adjustable with repect to each other, the weld wheels may be adjusted to apply pressure directly to the heated area of the overlapping first and second membranes 12 and 14 on each side of the roof membrane fastener 18 thereby pressing the heated membranes together and ensuring the formation of a strong sealing weld. Furthermore, because roof membrane fasteners 18 of different widths and types may be employed to secure the roof membrane to the roof deck 16 the weld wheels 62 and 64 may be laterally adjusted to ride clear of any type of fastener thereby preventing any vertical deviation of the bottom of the nozzle 40 from the first membrane 12.

The welding process using the roof membrane welding apparatus 10 in accordance with the present invention is carried out by laying a first membrane 12 on top of the roof deck 16 or other roofing structure. A roof membrane fastener 18 is then fastened to the first membrane 12 and to the roof deck 16 as known in the art. It will be appreciated that although a batten bar is shown in FIGS. 22 and 23, other fasteners may be used; e.g., a line of stress plates. The roof membrane fastener 18 is fastened adjacent and parallel to an edge of the first membrane 12 along the entire length of the edge, but does not touch the edge of the first membrane. A second membrane 14 is then laid over the first membrane 12 so as to overlap portions of the first membrane on both sides of the roof membrane fastener 18. After the first and second membranes 12 and 14 have been laid in the above overlapping position, the nozzle 40 of the roof membrane welding apparatus 10 is inserted between the first and second membranes 12 and 14 and transverse the width of the roof membrane fastener 18. The nozzle 40 is then moved along and between the first and second membranes 12 and 14. The nozzle transmits or directs air heated by the heating element through the outlet 44, to form heat sealing welds which hold the overlapping portions of the first and second membranes 12 and 14 together. One may control the amount of heat being applied to the membranes by adjusting the heating element, the blower speed, the width of the opening 50 in the outlet 44 or by controlling the speed of the motor. The outlet 44 forms a weld simultaneously on both sides of the roof membrane fastener 18.

The patents and documents described herein are hereby incorporated by reference.

Having described presently preferred embodiments of the invention, it is to be understood that it may be otherwise embodied within the scope of the appended claims.

What is claimed is:

1. A dual-weld roof membrane welding apparatus capable of welding a first membrane and an overlapping second membrane by simultaneously applying a weld on opposite sides of at least one roof membrane fastener fastened through the first membrane and located under the overlapping second membrane, the apparatus comprising:

a movably supported chassis;

a hot air welder attached to said chassis including a nozzle having an outlet including at least one opening for simultaneously applying a weld on opposite sides of the roof membrane fastener to weld the overlapping second membrane and the first membrane; and at least one weld wheel of a duo-durometer material rotatably attached to said chassis and located rearward of said nozzle relative to a direction of movement of said apparatus and capable of simultaneously applying pressure to the weld on each side of the roof membrane fastener.

2. The apparatus of claim 1 wherein said at least one opening is of an adjustable width.

3. The apparatus of claim 1 wherein the outlet includes two openings, at least one of said openings is of an adjustable width to selectively apply the heated air only on each side of the roof membrane fastener.

4. The apparatus of claim 1 wherein said nozzle includes a distributor housing formed of two matching sections.

5. The apparatus of claim 4 wherein at least one section of said two matching sections includes at least one slot and said other section includes a fastener operatively connected through said at least one slot to control a sliding movement of said matching sections to vary the width of said at least one opening.

6. The apparatus of claim 1 further comprising at least one guide rail attached to an underside of said nozzle to maintain a bottom surface of said nozzle a selected distance away from a top surface of the first membrane.

7. The apparatus of claim 6 wherein the nozzle includes two parallel spaced guide rails.

8. The apparatus of claim 7 wherein at least one of said guide rails is laterally adjustable to accommodate therebetween roof membrane fasteners of different width.

9. The apparatus of claim 7 wherein said at least one opening spans across the entire width of the roof membrane fastener to form a weld simultaneously on each side of the fastener.

10. The apparatus of claim 7 wherein the outlet includes two openings to selectively apply the heated air only on each side of the roof membrane fastener.

11. The apparatus of claim 2 wherein said nozzle includes a distributor housing formed of two matching sections.

12. The apparatus of claim 11 wherein at least one section of said two matching sections includes at least one slot and said other section includes a fastener operatively connected through said at least one slot to control a sliding movement of said matching sections to vary the width of said at least one opening.

13. The apparatus of claim 2 further comprising at least one guide rail attached to an underside of said nozzle to maintain a bottom surface of said nozzle a selected distance away from a top surface of the first membrane.

14. The apparatus of claim 13 wherein the nozzle includes two parallel spaced guide rails.

15. The apparatus of claim 13 wherein at least one of said guide rails is laterally adjustable to accommodate therebetween roof membrane fasteners of different width.

16. A process of welding a first membrane and an overlapping second membrane by simultaneously applying a weld on opposite sides of a roof membrane fastener fastened through the first membrane and located under the overlapping second membrane, the process comprising the steps of:

providing a first membrane;

fastening the first membrane to a roof deck using at least one roof membrane fastener adjacent and parallel to an edge of the first membrane along the edge of the first membrane;

providing a second membrane over the first membrane so as to overlap portions of the first membrane on both sides of the at least one roof membrane fastener;

providing a dual-weld roof membrane welding apparatus including a movably supported chassis, a hot air welder attached to the chassis including a nozzle having an outlet and at least one weld wheel of a duo-durometer material located rearward of the nozzle relative to a direction of movement of the apparatus;

positioning the outlet between the first and second membranes and transverse the at least one roof membrane fastener;

transmitting heated air through the outlet to simultaneously form a weld on each side of the at least one roof membrane fastener to hold the overlapping portions of the first and second membranes together;

applying pressure directly to the weld on each side of at least one roof membrane fastener to press the heated membranes together to form a heat sealing weld.

17. The process of claim 16 further comprising the step of adjusting the opening width of the outlet.

* * * * *